United States Patent
Asaria et al.

(10) Patent No.: US 10,489,870 B2
(45) Date of Patent: Nov. 26, 2019

(54) ORDER PROCESSING SYSTEMS USING PICKING ROBOTS

(71) Applicants: Ali Asaria, Guelph (CA); Jeffery Woods, Kitchener (CA)

(72) Inventors: Ali Asaria, Guelph (CA); Jeffery Woods, Kitchener (CA)

(73) Assignee: Tulip.IO Inc., Kitchener (CA)

( * ) Notice: Subject to any disclaimer, the term of this patent is extended or adjusted under 35 U.S.C. 154(b) by 0 days.

(21) Appl. No.: 15/650,188

(22) Filed: Jul. 14, 2017

(65) Prior Publication Data

US 2018/0122032 A1   May 3, 2018

Related U.S. Application Data

(63) Continuation of application No. 13/903,361, filed on May 28, 2013, now abandoned.

(60) Provisional application No. 61/652,261, filed on May 28, 2012.

(51) Int. Cl.
  *G06F 7/00*   (2006.01)
  *G06Q 50/28*  (2012.01)
  *G06Q 10/08*  (2012.01)

(52) U.S. Cl.
  CPC .............. *G06Q 50/28* (2013.01); *G06Q 10/08* (2013.01)

(58) Field of Classification Search
  None
  See application file for complete search history.

(56) References Cited

U.S. PATENT DOCUMENTS

| | | | |
|---|---|---|---|
| 7,751,928 B1 | 7/2010 | Antony et al. | |
| 8,423,431 B1 | 4/2013 | Rouaix et al. | |
| 10,017,322 B2 | 7/2018 | High et al. | |
| 2005/0149226 A1* | 7/2005 | Stevens | B65G 1/1371 700/214 |
| 2005/0177446 A1* | 8/2005 | Hoblit | G06Q 10/10 705/26.1 |
| 2005/0238465 A1* | 10/2005 | Razumov | A47F 10/02 414/273 |
| 2006/0206235 A1* | 9/2006 | Shakes | G06Q 10/08 700/216 |
| 2006/0293810 A1 | 12/2006 | Nakamoto | |
| 2012/0330458 A1* | 12/2012 | Weiss | B66F 9/063 700/216 |

* cited by examiner

*Primary Examiner* — Yolanda R Cumbess
(74) *Attorney, Agent, or Firm* — Bereskin & Parr LLP/S.E.N.C.R.L., s.r.l.

(57) ABSTRACT

According to one aspect, a system for transporting products that includes at least one picking robot including at least one robot processor, and at least one order-processing device including at least one order-processing processor in data communication with the at least one robot processor. At least one of the order-processing processor and the robot processor is configured to receive at least one order including at least one product to be picked, generate at least one picking itinerary based upon the at least one order and warehouse information, generate at least one travel path for the at least one robot based upon the picking itinerary, and direct the robot along the travel path.

20 Claims, 10 Drawing Sheets

ORDER PROCESSING SYSTEMS USING PICKING ROBOTS

RELATED APPLICATIONS

This application claims the benefit of U.S. Provisional Patent Application Ser. No. 61/652,261 filed on May 28, 2012, by the present inventor(s), and entitled "ORDER PROCESSING SYSTEMS USING PICKING ROBOTS", the entire contents of which are hereby incorporated by reference herein for all purposes.

TECHNICAL FIELD

The embodiments described herein relate generally to inventory systems, and more particularly to systems, methods, and apparatuses for transporting products to or from storage units (or both) in a warehouse or other storage location using robots.

INTRODUCTION

A warehouse that stores products may store hundreds if not thousands of different types of products. A number of these different products may be grouped together and stored in one or more storage units (e.g., on shelves), which may be placed at various locations throughout the warehouse.

In some cases, these locations are grouped together such that related items are found in proximity. However, in many cases, items are grouped into different shelves at various different locations. The location of particular shelves may change over time, for example as the number of products or their popularity changes.

An order for products (e.g. a purchase order) may include a request for a number of different products that are located at various locations within the warehouse. It can be challenging to fulfil the order in an efficient manner because of the distribution of products within the warehouse.

SUMMARY

According to some aspects, there is provided a system for transporting products within a warehouse, the system includes a plurality of picking robots, each of the picking robots having a drive unit coupled to at least one product container and at least one robot processor for controlling the drive unit, and each of the picking robots having robot information associated therewith indicative of current status of the robot. The system also includes at least one order-processing device including at least one order-processing processor in data communication with the at least one robot processor. At least one of the order-processing processor and the robot processor is configured for: receiving at least one order identifying at least one product to be transported; obtaining warehouse information indicative of a location of the at least one product within the warehouse; generating at least one picking itinerary based upon the at least one order and warehouse information, the at least one picking itinerary includes information indicative of the location of the at least one product and if there are multiple products to be transported, then a sequence for transporting the products; selecting one of the picking robots to execute the picking itinerary based upon the robot information associated with the robots; generating at least one travel path for the selected robot based upon the picking itinerary; and directing the drive unit of the selected robot to move the robot along the travel path to the location of the at least one product for transporting the at least one product in the at least one container.

In some aspects, the order-processing processor is configured for: receiving at least one order identifying at least one product to be transported; obtaining warehouse information indicative of a location of the at least one product within the warehouse; generating at least one picking itinerary based upon the at least one order and warehouse information, the at least one picking itinerary includes information indicative of the location of the at least one product and if there are multiple products to be transported, then a sequence for transporting the products; selecting one of the robots to execute the picking itinerary based upon the robot information associated with the robots; and providing the picking itinerary to the robot processor of the selected robot.

In some aspects, the robot processor of the selected robot is configured for: receiving the picking itinerary from the order-processing processor; generating at least one travel path for the selected robot based upon the picking itinerary; and directing the drive unit of the selected robot to move the robot along the travel path to the location of the at least one product for transporting the at least one product in the at least one container.

In some aspects, the warehouse information includes utilization information associated with the location of the at least one product, the utilization information being indicative of whether the location is under-utilized or over-utilized, and wherein the at least one of the order-processing processor and the robot processor is configured for determining the sequence for transporting the products based upon the utilization information.

In some aspects, the warehouse information includes congestion information indicative of one or more congested areas within the warehouse, and wherein the at least one of the order-processing processor and the robot processor is configured for determining the sequence for transporting the products based upon the congestion information.

In some aspects, the warehouse information is updated dynamically.

In some aspects, the warehouse information is updated, generating a new picking itinerary based upon the updated warehouse information to replace an existing picking itinerary.

In some aspects, the new picking itinerary is generated when at least one product is received at the picking robot.

In some aspects, the travel path is generated based upon markers in at least one of a floor of the warehouse, a ceiling of the warehouse, and one or more storage units.

In some aspects, at least one storage unit at the location includes a visual indicator and the at least one of the robots further comprises a visual indicator, and the indicators at the storage unit and the robot cooperates to visually indicate to a picker the storage unit where the product is stored and the robot where the product should be placed.

In some aspects, the system further includes automated feeder mechanism provided at least one storage unit configured to place the at least one product in the at least one container of the product.

According to some other aspects, there is provided a picking robot including at least one product container, a drive unit coupled to the at least one product container, a communication device for communicating with at least one order-processing processor, and at least one robot processor for controlling the drive unit. The at least one robot processor configured for receiving a picking itinerary from the order-processing processor, generating at least one travel path for the selected robot based upon the picking itinerary, and directing the drive unit of the selected robot to move the robot along the travel path to the location of the at least one product for transporting the at least one product in the at least one container.

In some aspects, the at least one robot processor is configured for avoiding at least one of mobile obstacles and stationary obstacles along the travel path.

In some aspects, the travel path is generated dynamically as the robot moves to the at least one product location.

In some aspects, the robot further includes a display, and the at least one robot processor is further configured for outputting on the display at least one of product information indicative of the product to be picked and storage unit information indicative of storage unit where the product is stored.

In some aspects, the robot further includes an input device, and the at least one robot processor is further configured for using the input device to confirm that the product is received within the at least one container of the robot.

In some aspects, the robot further includes a positioning device for determining a current position of the robot, and the at least one robot processor is further configured to generate the travel path based upon the current position of the robot.

In some aspects, the robot processor is configured for determining a current position of the robot by identifying one or more storage units proximate to the robot.

In some aspect, the at least one robot processor is a processor of a tablet-form computer.

In some aspects, the drive unit of the robot is obtained from a household vacuum robot.

In some aspects, the robot further comprise a visual indicator, the visual indicator being configured to cooperate with a visual indicator associated with a storage unit to visually indicate to a picker the storage unit where the product to be transported is stored and the robot where the product should be placed.

According to some other aspects, there is provided an order processing device including at least one order-processing processor, the at least one order-processing processor configured for: receiving at least one order identifying at least one product to be transported; obtaining warehouse information indicative of a location of the at least one product within the warehouse; generating at least one picking itinerary based upon the at least one order and warehouse information, the at least one picking itinerary includes information indicative of the location of the at least one product and if there are multiple products to be transported, then a sequence for transporting the products; selecting at least one of the robots to execute the picking itinerary based upon the robot information associated therewith; and providing the picking itinerary to the robot processor of the selected robot.

In some aspects, the robot information includes information indicative of a payload of the robot.

In some aspects, the at least one order-processing processor is configured to generate more than one picking itinerary for the at least one order and to select as many of the robots to execute the picking itineraries.

According to some other aspects, there is provided a method for transporting products. The method includes receiving at least one order identifying at least one product to be transported, obtaining warehouse information indicative of a location of the at least one product within the warehouse, generating at least one picking itinerary based upon the at least one order and warehouse information, the at least one picking itinerary includes information indicative of the location of the at least one product and if there are multiple products to be transported, then a sequence for transporting the products, selecting one of the picking robots to execute the picking itinerary based upon the robot information associated with the robots, generating at least one travel path for the selected robot based upon the picking itinerary, and directing the drive unit of the selected robot to move the robot along the travel path to the location of the at least one product for transporting the at least one product in the at least one container.

BRIEF DESCRIPTION OF THE DRAWINGS

Embodiments will now be described, by way of example only, with reference to the following drawings, in which.

DESCRIPTION OF SOME EMBODIMENTS

Figure 1:
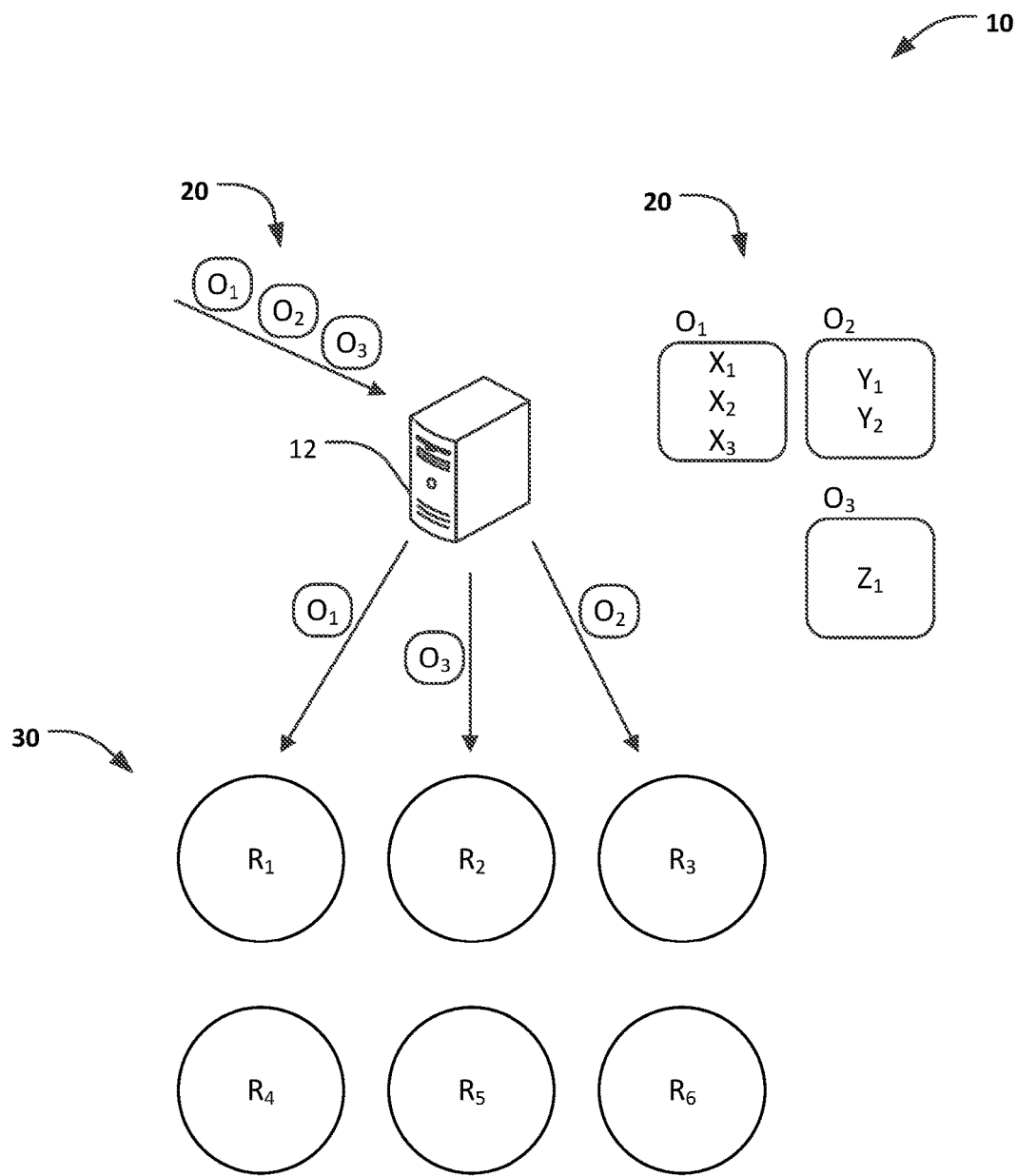
FIG. 1 is a schematic diagram illustrating a system for transporting products according to some embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described, but rather as merely describing the implementation of various embodiments.

In some cases, the embodiments of the systems and methods described herein may be implemented in hardware or software, or a combination thereof. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

In order to reduce cost and improve efficiency, inventory picking systems in a warehouse often strive to improve the efficiency of individual staff members at picking orders, and increasing the speed and throughput of orders being processed in the warehouse. Generally, individual human staff pickers walking from one location to another can make up more than half of a human order picker's time. That is, a human picker may spend half of his time in transit.

As introduced above, a warehouse may store many different products at many locations throughout the warehouse. When orders for one or more products are received, the ordered products are normally picked from various locations in the warehouse such that these products can be further processed (e.g., packaged and then shipped). To facilitate processing of the orders, many warehouses employ inventory systems to assist with fulfilling orders.

In some cases, the orders received by a warehouse may be fulfilled according to a "single pick" method. In a "single pick" method, the products for each individual orders are independently picked by a human warehouse worker. That is, a single human picker wanders around the warehouse picking the products for a single order. In a "single pick", the products from multiple orders are not combined for the purposes of picking the products. Generally, individual human pickers are evaluated on their ability to pick as many orders per hour, or the number of products picked per hour (as some orders may contain more than one product).

However, since the products for each order are picked independently, the single pick system is inefficient in that it requires individual pickers to travel back and forth between the various storage units in the warehouse. In a large warehouse, this can lead to a lot of wasted travel that is a source of inefficiency.

In some cases, to improve on one or more limitations of the single pick method, a "multi-pick" method of picking products may be used. In a multi-pick system, batches of orders are picked together. That is, the products from multiple orders are combined to generate a combined pick list including products from multiple orders. The products from the combined pick list are then picked by a human picker and gathered in a packing location where they are sorted for packing and shipping.

In some cases, as the products are picked, the products may be placed in one container or separated into multiple containers, with each container being indicative of one or more orders. For example, a warehouse employee may walk through the warehouse to pick various products in the combined pick list. By the time they have picked all the products on the combined pick list, they will have the products necessary to fulfil the orders that were used to generate the combined pick list. The "multi-pick" approach may be advantageous over the single pick approach in that it may reduce the amount of travel necessary per order. However, it is more complicated than the "single-pick" approach.

In some cases, "zone picking" methods may also be employed at a warehouse. Zone picking methods tend to reduce travel between various locations in the warehouse and may reduce collisions between the pickers. A zone picking method divides the products in an order into multiple groups. Each group includes the products that are to be picked from one of distinct physical locations in the warehouse, which are often referred to as "zones".

For example, in a warehouse with three major distinct physical zones, namely zones "A", "B" and "C", a "zone picking" system can separate each inbound order into one to three groups of products. Each group of products include the products that are located in each of the zones A, B, and C.

In some cases, each particular order may only include items from one group (e.g. if all of the products in the order are located only in one zone), two groups (e.g. if all of the products in the order are located only in two zones), and so on.

The "zone picking" method may generate multiple pick lists for each order based upon the grouping. The zone pick method may be advantageous over the "single pick" and "multi-pick" methods in that it can further reduce travel between different areas in the warehouse for the human pickers. Furthermore, individual order pickers may become more efficient at picking products within each particular zone as they become more familiar with the products in their zones.

One disadvantage of the zone pick method is that the multiple products from the multiple orders must be collated downstream in the picking process. For example, in a system that separates an order into three groups of products, after each group of products is picked, the system must then find a way to combine or collate each of the three groups of products to fulfil the original order.

Collation of products from multiple zones could be challenging in a large warehouse, where there may be thousands or tens of thousands of orders being processed each day, with many different zones. One challenge could stem from the orders being fulfilled in a non-synchronous manner. For example, when the orders are divided into multiple groups of products, and each group of product is picked independently, (i.e. the picking of the groups are non-synchronous), it is unpredictable as to when all the groups of a particular single order will have been picked.

In some cases, collation of zone picked orders in large warehouses may be implemented using complex tilt-tray sorters or complex conveyance systems (e.g. belt conveyors, etc.). However, such systems are generally complex and expensive and they may not be suitable for smaller warehouses. It may also be difficult to reconfigure such systems.

Referring now to FIG. 1, illustrated therein is a system 10 for transporting products to and from storage units in a warehouse according to some embodiments. The storage units may include various combinations of shelves, bins, and other suitable structures for storing various types of products.

Figure 2:
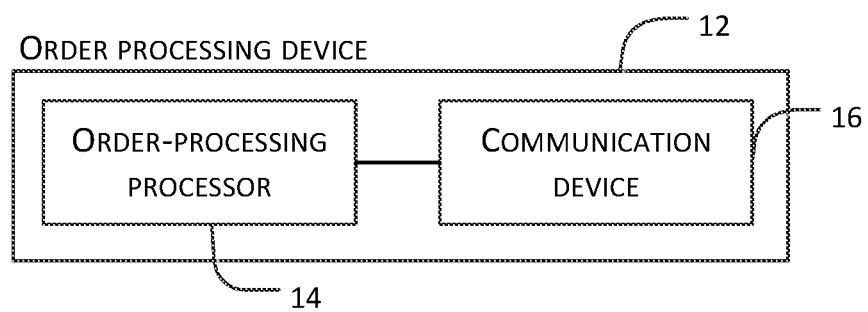
FIG. 2 is a schematic diagram illustrating exemplary components of the order processing device of FIG. 1.

The system 10 in this embodiment includes an order processing device 12, which includes an order-processing processor 14 and a first communication device 16 as shown in FIG. 2. In some embodiments, the order processing device 12 may be implemented using one or more of a server, personal computer, data storage devices, etc.

The order-processing processor 14 is configured to receive a plurality of orders as generally indicated by reference numeral 20. In this particular example, the orders 20 include orders "$O_1$", "$O_2$" and "$O_3$". Each of the orders 20 includes one or more products to be picked. In the example as shown, the order $O_1$ includes a request for products $X_1$, $X_2$, and $X_3$, the order $O_2$ includes a request for products $Y_1$ and $Y_2$, and the order $O_3$ includes a request for product $Z_3$.

The order-processing processor 14 is configured to select one or more picking robots 30 to execute the orders 20 based upon robot information associated with the robots. The robot information may include various capabilities of each of the robots. For example, robot information may include load capacity information indicative of the weight of the products it could transport. If the order 20 includes a heavy product, a robot 30 with a sufficiently large load bearing capacity may be assigned to execute the itinerary associated with that order 20. On the other hand, if the order 20 includes only relatively lighter products, then a robot 30 with a smaller carrying capacity may be assigned.

The robot information may include information about the structure of the container for a particular robot, such as whether the robot has more than one container or compartment so as to determine whether the robot can execute multiple orders.

In some cases, the robots 30 may periodically poll the order-processing processor 14 to determine whether an order 20 has been assigned to the robots 30. In some cases, the order 20 may be "pushed" to a given robot 30 when the order 20 is assigned to that robot 30.

In some cases, more than one order 20 (i.e. multiple orders 20) may be assigned to a single robot 30. A robot 30 with the plurality of orders assigned thereto may execute the orders 20 simultaneously or sequentially.

In some cases, a single order 20 may be split between multiple robots 30 and picked products may be recombined at a later time. This may be implemented by generating multiple picking itineraries based upon the single order 20 and assigning those picking itineraries to different robots 30, for example as generally described below.

The exemplary robots 30 in the system 10 include robots $R_1$, $R_2$, $R_3$, $R_4$, $R_5$ and $R_6$, although greater or fewer numbers of robots can be used. In the example as shown, the order $O_1$ is assigned to the first robot $R_1$, order $O_2$ to the second robot $R_3$, and order $O_3$ to the third robot $R_2$. In some embodiments, the number of robots 30 may differ. For example, in large warehouses, there may be dozens, hundreds or even thousands of robots in use.

Figure 3:
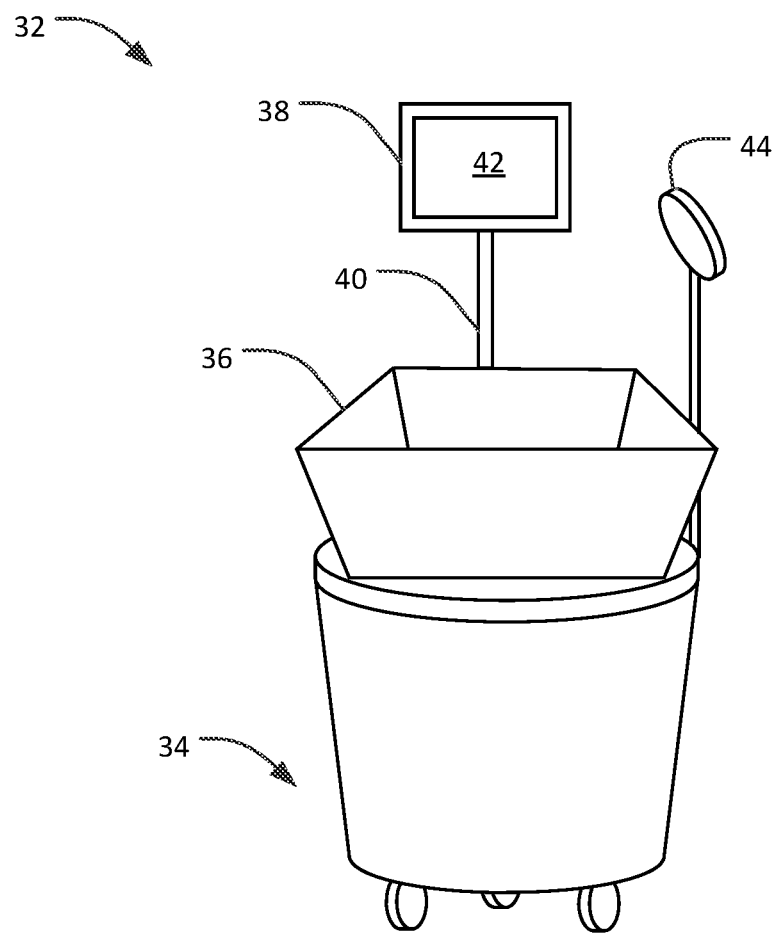
FIG. 3 is a schematic diagram illustrating an exemplary robot of the system of FIG. 1.
Figure 4:
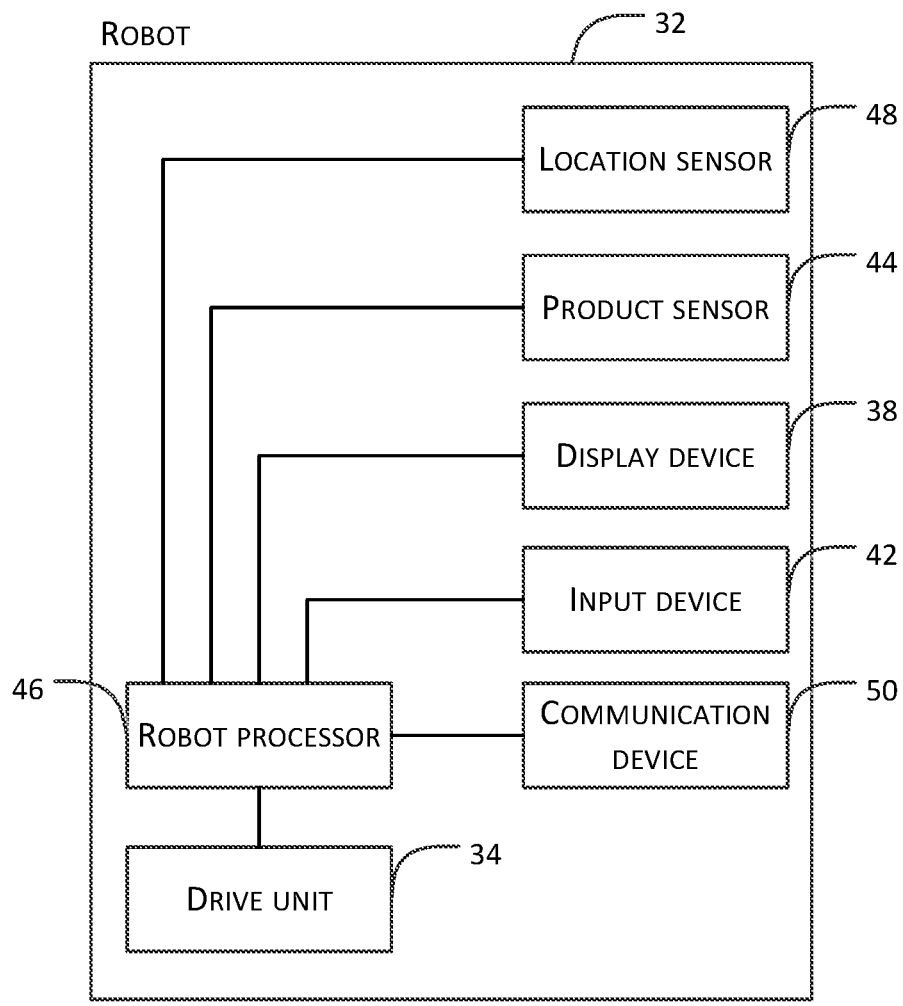
FIG. 4 is a schematic diagram illustrating exemplary components of the robot shown in FIG. 3.

In some embodiments, each robot 30 may include one or more components of an exemplary robot 32 as shown in FIGS. 3 and 4.

The exemplary robot 32 includes a drive unit 34 for moving the robot 32 to various locations within the warehouse. The drive unit 34 is operable to move the robot from one location to another location. For example, the drive unit 34 may include wheels and a motor to drive the wheels. In some cases, the drive unit 34 may include one or more sensors and/or suitable hardware to assist with navigation and to avoid obstacles. The drive unit 34, for example, may include devices designed by iRobot Corporation or other suitable robot manufacturers.

The robot 32 includes at least one container 36 for carrying one or more products. In some cases, the container 36 may be compartmentalized or there may be more than one container 36 for keeping the products carried therein separate to fulfil several orders simultaneously. For example, if there is more than one order to be filed (e.g. two or more orders), the products for these orders may be picked simultaneously by a single robot by placing the orders in separate compartments of a single container and/or in separate containers.

In some cases, the order-processing processor 14 may be configured to determine the size of the products (e.g. by weight, by volume, etc.) in each particular order to determine whether to combine a plurality of orders and to determine which of the robots (e.g. the robots with compartments/multiple containers) to assign for particular orders.

In some cases, characteristic information associated with each of the robots 30 may be stored. The characteristic information for each of the robots 30 may include information about various capabilities and/or limitations about the robot 30, such as its maximum load capacity, maximum number of orders that can be served, and so on. The characteristic information associated with each of the robots 30 may assist the order-processing processor 14 to select a suitable robot 30 to fulfil one or more orders 20.

As shown in FIG. 3, the robot 32 may include a display device 38. The display device 38 may be configured to display various information such as information about the robot 32, the order, the product(s) currently being picked, an identification of which particular compartment (if there are multiple compartments) in which to place the product that is being picked, and so on. This may allow the robot 32 to communicate information to a human operator such as a human picker stationed at one or more shelves or storage areas.

In some cases, the display device 38 may allow the robot to communicate with a non-human picker (e.g. a robotic picking arm) at a shelf (e.g. by displaying a barcode or QR code for scanning by the robotic arm, for example). In some examples, the display device 38 may be implemented using a LCD screen or any other suitable display hardware.

The display device 38 may be a flat screen display such as a display of a commercially available tablet-form computer running iOS or Android™ operating system developed by Apple Inc. and Google Inc. respectively. In some embodiments, the robot processor 46 may be the processor available in the tablet-form computers. Using a commercially available tablet-form computer may allow cost-effective implementation of the robot 32.

The display device 38 may be coupled to the robot 32 using a coupling device 40. The coupling device 40 may be an arm, a bracket, a mount or any other suitable hardware for coupling the display device 38 to the robot 32. In some cases, the coupling device 40 may be adapted for orienting the display device 38 in a manner suitable for observation of the information displayed thereon.

In some embodiments, the display device 38 may be located at a location other than the robot 32. That is, the display device 38 may not be physically coupled to the robot 32. For example, the display devices 38 may be provided at product locations (e.g. mounted on shelves where products are stored) to inform the product pickers assigned to those shelves. In some cases, the display devices 38 may be move along with the product pickers to different product locations.

Each display device 38 that is detached from the robot 32 and provided at a location may have a wireless communication device for communicating with the order processing device 12 or the robots 32 that are travelling to or are waiting the location associated with the display device 38 (or both)

such that the display devices 38 may display information about the products to be picked.

In some cases, the display device 38 that detached from the robot 32 may also have an input device such as the input device 42 described herein below or a product sensor such as the product sensor 44 also as described herein below (or both an input device and a product sensor).

In some embodiments, the robot 32 may include an input device 42. The input device 42, as in the illustrated example, may be combined with the display device 38 in the form of a touch sensitive layer (e.g. a capacitive or pressure sensitive layer) on the display device 38. In some embodiments, the input device 42 may include other types of input devices, such as physical switches, buttons, keyboards, a mouse, optical sensors, and so on. The input device 42 may generally allow a human operator to interface with the robot 32.

The robot 32 may include a product sensor 44 for recognizing the products that are being placed into or removed from of the container 36. The product sensor 44 may operable to confirm that a product being placed into the container 36 and/or identify the product that is being placed to confirm that the correct product is being picked.

The product sensor 44 may include, for example, near-field wireless readers such as RFID scanners, optical sensors such as barcode sensors, camera or other vision systems, laser scanners, or any other suitable device operable to obtain information about the product that is being placed into or removed from the container 36. In the exemplary robot 32, the product scanner 44 is a wireless sensor.

The product sensor 44, in other examples, may include a weighing scale and the weight of the product may be used to confirm that a product has been placed in the container 36, and furthermore that the product is the correct product.

In some embodiments, the product sensor 44 may be an input device such as a button. The button may be a hardware button or a software button provided through the combination of the display device 38 and the input device 42.

The robot 32 also includes a robot processor 46, which may be operatively coupled to a location sensor 48 and a communication device 50, in addition to the drive unit 34, the display device 38, the input device 42 and the product sensor 44 described above. The robot processor 46 may be configured to execute one or more methods or modules as generally shown and described herein. The robot processor may be a hardware processor manufactured by Intel Corp. or AMD Corp., or any other suitable hardware processor. In some embodiments, the robot processor 46 and the order-processing processor 14 may be the same processor.

The communication device 50 is generally configured to communicate with the order processing device 12. The communication device 50, for example, may be a wireless communication device compliant with IEEE 802.11 standards (i.e. "WI-FI") or any other suitable wireless communication device. In some cases, the communication device 50 may be suitable hardware for receiving data through conductive wires or plates (or both). In some cases, where there are a large number of robots being deployed, a wireless communication device and a suitable wireless communication network(s) may be implemented to facilitate communication between the robots 30 and the server 12.

In some embodiments, the location sensor 48 is a sensor suitable for determining a current position of the robot 32 in the warehouse. The location sensor 48 may include a hardware location sensor such as an indoor GPS.

In some cases, the location sensor 48 may be implemented using a software module. For example, the location sensor 48 may determine the location of the robot 32 based upon from information about the surroundings of the robot, such as which storage units are nearby, which storage units the robot 32 has previously passed near to, and so on. In another example, the location sensor 48 may include one or more optical sensors for obtaining visual information, and which can be processed by the robot processor 46 to determine the location of the robot 32.

In some cases, the warehouse may have positioning beacons (e.g. RFID tags, visual markers, QR codes, bar codes, and so on) placed within the warehouse that can be detected by the location sensor 48 to help assist the robot 32 in determining the location of the robot 32 within the warehouse.

Figure 5:
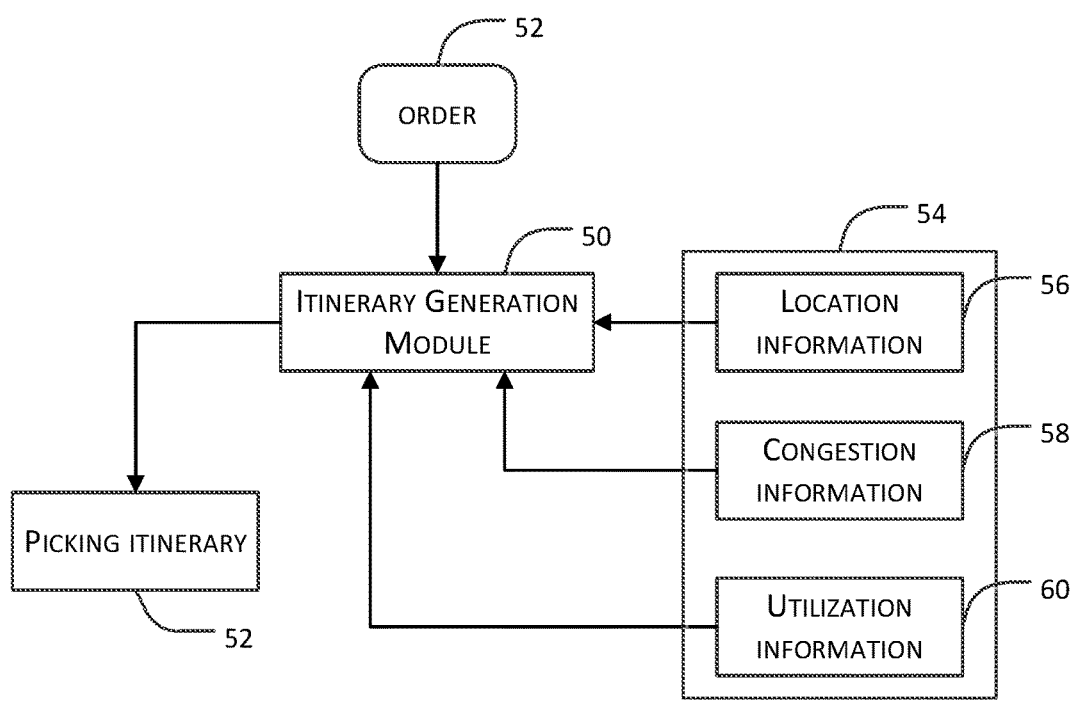
FIG. 5 is a schematic diagram illustrating an exemplary itinerary generation module that may be provided by at least one of the order processing device and the robots.

Referring now to FIG. 5, illustrated therein a schematic diagram of an itinerary generation module 50 which may be executed by the order-processing processor 14 or the robot processor 46 (or both). That is, the order-processing processor 14, the robot processor 46, or a combination thereof may provide the itinerary generation module 50 or otherwise provide the functionality provided by the itinerary generation module 50. As such, the picking itinerary could be determined autonomously by each of the robots 32 alone, the order processing device 12 alone, or by a combination of the robot 32 and the device 12.

The itinerary generation module 50 generates a picking itinerary 62 that includes the products to be picked and a sequence (i.e. an order) of picking products. The picking itinerary 62 is generated based upon the received order 52 and warehouse information 54. The warehouse information 54 includes information about the warehouse that could be used to generate the picking itinerary 62. The picking itinerary 62 is provided to one of the robots 30 for execution. That is, the robot 32 may determine where to go in the warehouse based upon the picking itinerary 62 as described below.

The order 50 may be an order comprising products to be picked, such as one of the orders $O_1$, $O_2$ and $O_3$ as shown in FIG. 1. Generally when an order is received, a list of products to be picked is generated. For example, the order $O_1$ would indicate that the products $X_1$, $X_2$, and $X_3$ should be picked. The itinerary generation module 50 will then determine a sequence for picking the products on the list based upon the warehouse information 54.

In some embodiments, multiple itineraries may be generated for a single order. For example, if two robots may more efficiently fulfil a single order (e.g. in a shorter amount of time or travel distance because the products are located in opposite ends of the warehouse), two picking itineraries may be generated. The itineraries may then be provided to two different robots for execution, in some cases simultaneously (e.g. the robots may pick "in parallel").

The warehouse information 54 in some embodiments may include one or more different types of information such as location information 56, congestion information 58, and utilization-information 60.

The location information 56 may include information indicative of the location of the products to be picked in the warehouse and distances between the start point and the products. The location information 56, for example may include a map or plan of the warehouse (e.g. layout of the storage units such as shelving units within the warehouse) and distances between various locations in the warehouse.

The congestion information 56 may include information indicative of the congested areas within the warehouse where it might be difficult or slow for the robot 32 to travel to, or through, or both. This information may be considered when determining which product to pick next. For example, if an area of the warehouse becomes congested, a product located in another area may be picked first. In some cases, the congestion information 56 may be generated by a centralized system that receives information about location of various robots that are currently operational. In some embodiments, congestion information 56 may be generated by the robots based on their observations (e.g. if they notice that a particular pathway seems congested, the robot may decide to modify the itinerary).

In some cases, the congestion information 56 and the location information 56 may be combined to generate an estimated travel time for the robot 32. In such cases, the picking itinerary 62 may be generated based upon reducing the overall estimated travel time, for example, for individual robots, for a group of robots, and so on.

The utilization information 60 may include information about the utilization of human or non-human product pickers located at various storage units. In some embodiments, the product pickers include be human operators. In some embodiments, the product pickers may include one or more automated feeder mechanisms that are configured to transfer one or more products from one or more storage units to the container on the robot.

The utilization information 60 may identify pickers who are not busy or who have relatively lower wait times for the robots. For example, the system 10 may identify shelves, or areas of the warehouse that are less congested or busy. In such cases, the itineraries may be generated or updated such that the products that can be picked by the under-utilized pickers or areas are picked first, or at least sooner in the picking order.

In some embodiments, the warehouse information 54 may include other information that may be useful for generating picking itineraries.

After one or more picking itineraries 62 are generated, the generated picking itineraries are provided to one or more robots for execution.

In some embodiments, picking itineraries 62 may be updated as the robots pick products, for example in response to changing conditions within the warehouse (e.g. updated congestion information 56, utilization information 60, and so on).

In some embodiments, picking itineraries 62 as new orders are received and processed. For instance, a robot 32 may receive an updated list of products to pick in response to the system 10 receiving a new order while the robot 32 was picking. This dynamic update could include changing a quantity of items to be picked at a specific location (e.g. picking three tubes of toothpaste instead of two), or adding another product (e.g. adding mouthwash to the picklist).

Figure 6:
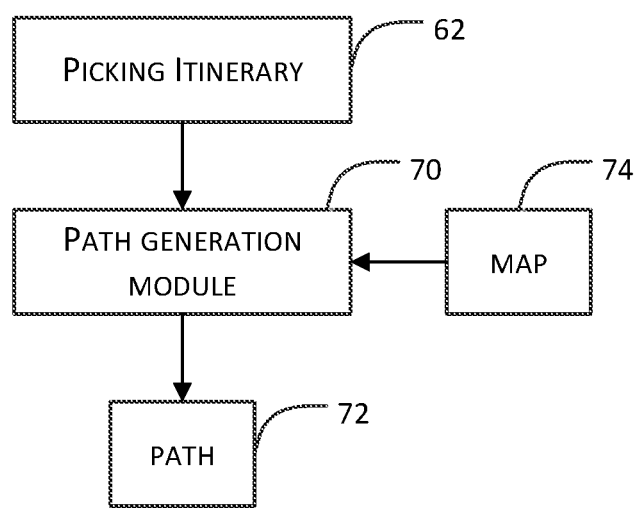
FIG. 6 is a schematic diagram illustrating an exemplary path generation module that may be provided by at least one of the order processing device and the robots.

Referring now to FIG. 6, illustrated therein is a schematic diagram of a path generation module 70 for generating a travel path 72 that may be executed by at least one of the robot processor 46 and the order processing processor 14 according to some embodiments. That is, the robot processor 46 or the order processing processor 14 (or both) may be configured to provide the path generation module 70 or otherwise provide the functionality provided by the path generation module 70. As such, the path 72 could be determined autonomously by each of the robots 32 alone, the order processing device 12 alone, or by a combination of the robot 32 and the order processing device 12.

The path generation module 70 generates the travel path 72 based upon the picking itinerary 62, and, in some cases, a current location of the robot 32, or a map 74 of the warehouse (or both). The path 72, for example, could be the path that should be taken to move the robot 32 from its current location to the product location where the next product in the picking itinerary to be picked is located.

The path 72 may include information to direct the robot to the product location. In some cases, the path 72 may include coordinates or positional markers indicative of the product location. In some cases, the path 72 may include a series of coordinates or position markers that the robot may follow to get to the product location. In some cases, the product location may refer to a general area within the warehouse (e.g. a zone) or a more specific location within the warehouse (e.g. a specific shelf, or a specific location).

The robot processor 46 is configured to direct the drive unit 34 to move the robot 32 to the product location generally along the travel path 72. That is, the robot 32 may general follow the travel path 72, although they may veer off the travel path 72, at least temporarily, to avoid obstacles (e.g. mobile or stationary obstacles). For example, the robot 32 may avoid human workers walking throughout the warehouse or other robots, existing shelving and storage units, boxes, pallets or equipment left on the warehouse floor, and other features that may be present in the warehouse that may inhibit the robot 32 from travelling along the travel path 72.

In some cases, the robot processor 46 may be configured to generate a new travel path if certain conditions are met. For example, if the robot is not able to continue on the current path due to obstacles and attempts at avoiding the obstacles have not been successful (e.g. within a particular period of time), then the robot processor 46 may be configured to generate a new travel path.

In another example, if the path involves transit through a congested area, the robot processor 46 may be configured to generate a new travel path to avoid areas of high congestion.

In some examples, generating a new travel path may be done dynamically, at various different time intervals (e.g. depending on operating characteristics or other variables) and in some cases with or without any communication thereof between the robot processor 46 and the order processing processor 14.

The robot processor 46 may also be configured to execute one or more combinations of the activities described herein as follows. The execution of these activities may be triggered by one or more events. For example, one or more of the activities may be executed when the robot 32 arrives at the product location, when the robot 32 receives the product it is collecting, or when the robot 32 is enroute to a product location.

In some embodiments, the robot 32 may be configured to wait at one or more wait areas associated with each product location until the products to be picked are received by the robot 32. This may be helpful, for example, in a situation where a human picker is assigned to multiple product locations. The robots 32 can travel to the product locations and wait at the associated wait areas until the products that it requires are received. This may provide more efficient use of the human picker's time.

In some embodiments, one or more of the robots 32 may wait at the designated wait area associated with the product location until they receive a command from the human picker to move to the next location. The instructions to move to the next location may be provided to the robots 32 individually or as a batch.

In some embodiments, the robots 32 may decide to move on to the next location based on some other criteria (e.g. a particular amount of time has passed).

In some embodiments, there may be a human picker at the product location for picking a product from the storage unit and placing that product in the container of the robot 32. In some embodiments, there may be an automatic feeder at the storage unity that is configured to pick the product from the storage unit and place it in the container of the robot 32 (e.g. a robotic picking arm, a conveyor, etc.). The robot processor 46 may be configured to assist the human picker or the automatic feeder (or both) by executing one or more of the following functions.

In some cases, the robot processor 46 may be configured to display the product that should be picked on the display device 38. For example, the robot processor 46 may be configured to display an image of, or text about, the product on the display device 38 (or both), and/or information about the storage location where the product is located when the robot 32 arrives at the product location. This can help the human operator to recognize the product that the robot wants from the storage unit(s) to fulfil its order.

In some cases, the robot may have one or more optical location indicators operable to indicate where the product is located. For example, the robot may have a laser pointer, mechanical pointer, or other suitable device operable to point to the storage unit where the product is located.

In some cases, the storage units may have one or more optical location indicators (e.g. lights such as LED lights) that are configured to indicate the location of the storage units where the product that the robot 32 wants is located. For example, there may be multiple storage units (e.g. storage bins) in a given location. In such cases, when a given robot is detected in the area, the optical indicators associated with the storage bins storing products that the robot is seeking could be activated. For example, storage bins may have lights associated therewith and the lights of the storage bins may be flashed to visually indicate to the picker that a desired product is located in a particular storage bins.

In some cases, a destination of the product to be picked may also have an optical destination indicator associated therewith. For example, the robot 32, various compartments of the container 36, and/or various containers 36 may have an optical destination indicator (e.g. flashing lights) to indicate to the picker that the product is to be placed in a particular container or a compartment of that robot 32.

In some cases, the optical indicators between a source of a product (e.g. a light at a storage unit) may be coordinated with a destination for the product (e.g. a light at a robot) to help a picker determine the location of the product and the destination of the product. For example, the optical indicator on the shelves and the optical destination indicator on the robots/containers may light up a same (or similar) colour such that the source and the destination are colour-coordinated. This may be helpful if there are multiple robots waiting in an area, as the colours can help the picker see which robot or which compartment of the robot to place the picked product in.

In some cases, the robot processor 46 may be configured to indicate the current payload of the robot 32 on the display device 38 (e.g. the total weight or volumetric dimensions of the products being carried).

In some cases, the robot processor 46 may be configured to indicate product location information on the display device 38. The product location information may be indicative of the location(s) of the product(s) for the current product location. For example, the product location information may include storage unit number (e.g. bin number), level (e.g. if there are multi-level shelves), and other information that may be helpful for the picker to locate the product to be picked.

In some cases, the robot processor 46 may be configured to indicate other products on the picking itinerary on the display device 38. In some cases, the robot 46 may be configured to indicate the next product on the picking itinerary, the last product picked, and so on. In some cases, the robot 46 may be configured to display the location of one or more products on the picking itinerary.

In some cases, the robot processor 46 may be configured to indicate one or more paths to the next location on the display device 38.

In some cases, the robot processor 46 may be configured to indicate the location of one or more other robots 32 and/or human pickers on the display device 38.

As noted above, the robot 32 may have the product sensor 44 for recognizing the products that are being placed into the container 36 or removed out of the container 36. The product sensor 44 may also be used to verify that the correct product has been received in the container 36 of the robot 32.

Once it is determined that all desired products at the given product location have been collected, a path to the next product on the product itinerary is generated, and the robot processor 46 directs the robot 32 to the next product location.

After all products are collected, in some embodiments the robot 32 moves to a designated area where the orders may be further processed. For example, products from multiple product itineraries may be collated to fill a single order or multiple orders, and products may be packed for shipping.

Figure 7:
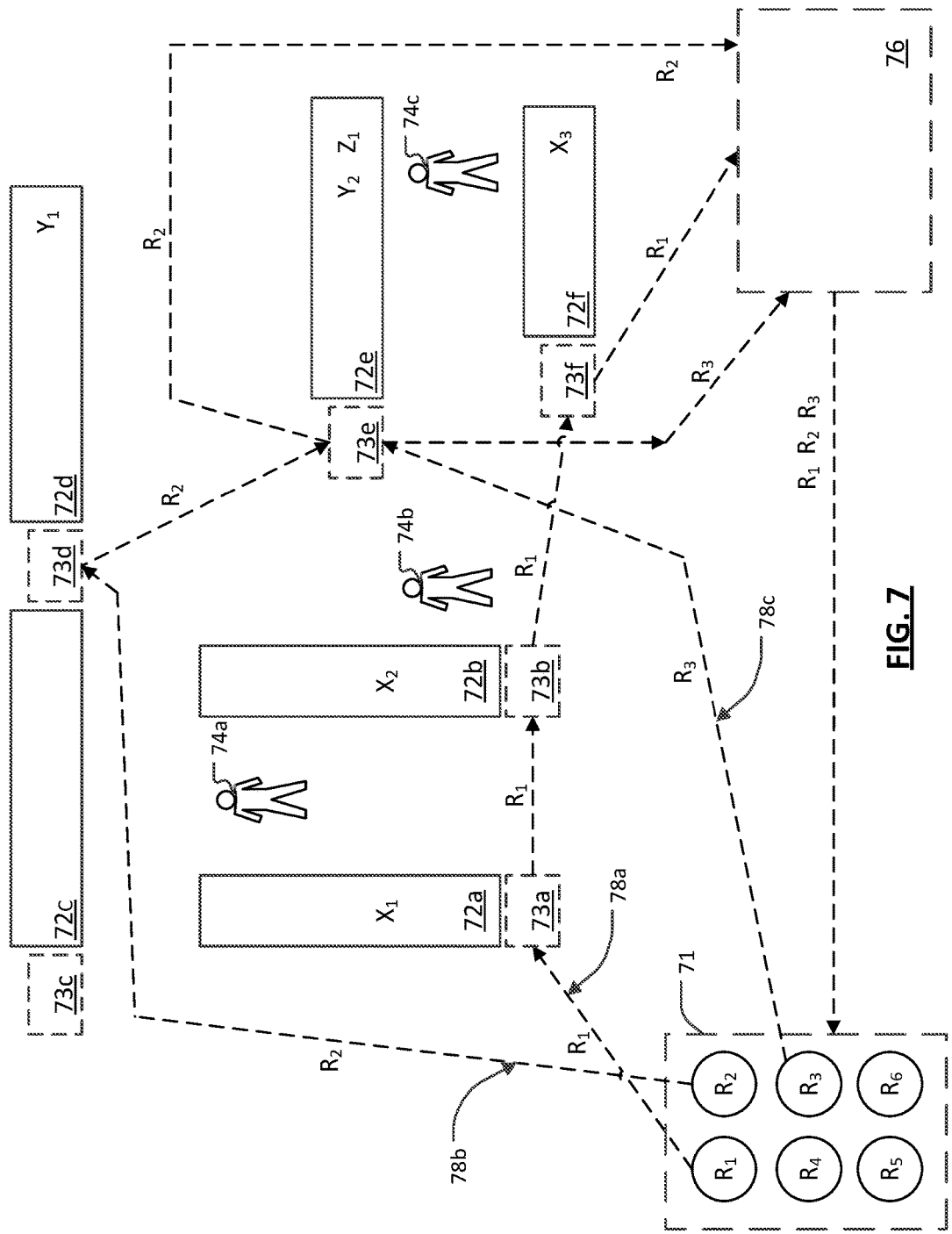
FIG. 7 is a schematic diagram depicting, by example, how some of the robots may operate in an exemplary warehouse environment to collect products to fulfil orders.

Referring now to FIG. 7, illustrated there in is a schematic diagram depicting, by example, how the robots 30 shown in FIG. 1 may operate in an exemplary warehouse environment 70 to collect products to fulfil the orders 20.

As shown, the warehouse 70 may have a start area 74 or "holding area" where robots 30 that are not currently being used may idle. The warehouse 70 also has an end area 76 or "finishing area" where the robots 30 that have collected all (or at least some of) the products on the product itinerary can move to so that their containers may be unloaded (in some embodiments the start area 74 and end area 76 may be the same or a similar location).

The warehouse 70 has various storage units 72a, 72b, 72c, 72d, 72e and 72f. These storage units, for example could be shelves where products are stored. The warehouse 70 in this embodiment has three human pickers 74, indicated by reference numerals 74a, 74b, and 74c. The human pickers 74 may be assigned to various storage units. For example, the picker 74a may be trained to move between the storage units 72a and 72c to obtain the products stored therein. Similarly, the picker 74b may be trained to move between the shelf 72b and 72d and the picker 74c between shelves 72e and 72f.

In this example, the robots are initially parked at the start area 71 until orders 20 are assigned to them. As noted above, robot $R_1$ is assigned order $O_1$, robot $R_2$ is assigned order $O_2$, and robot $R_3$ is assigned order $O_3$. A picking itinerary is generated for each of the robots as described above. After the picking itineraries are generated, a travel path to a next product location on the picking itinerary is generated for each robot.

In this example, a travel path 78a may be generated by the robot processor in robot $R_1$ to collect products for the order $O_1$.

The robot $R_1$ will travel along the path 78a to storage unit 72a where product $X_1$ is located. The robot $R_1$ will wait (at location 73a) for the picker 74a to place the product $X_1$ in its container. After the robot $R_1$ detects that the product $X_1$ has been placed in its container (e.g. by using its product sensor 44), the robot $R_1$ generates a travel path to the next product on the picking itinerary, which is product $X_2$. The robot $R_1$ then moves along the travel path to the storage unit 72b where it waits (at location 73b) to receive the product $X_2$. After the product $X_2$ is received, the robot $R_1$ travels to the storage unit 72f where it waits (at location 73f) for product $X_3$ to be loaded. After the product $X_3$ is loaded, the robot $R_1$ moves to area 76 where the products are unloaded. The robot $R_1$ then returns to area 74 to wait for further instructions from the order processing device 12. In some cases, the robot $R_1$ may be configured to wait in an area other than the starting area 71 to wait for further instructions from the order processing device 12.

Similarly, the robot $R_2$ will travel along the path 78b to storage unit 72d where product $Y_1$ is located. When the robot $R_2$ reaches the storage unit 72d, the robot will wait there (at location 73d) until the product $Y_1$ is placed in the container. The robot $R_2$ may display an image of the product $Y_1$ on its display device so as to communicate to the picker the product it is seeking.

After the robot $R_2$ detects that the product $Y_1$ has been placed in its container (e.g. by using its product sensor 44), the robot $R_2$ generates a travel path to the next product on the picking itinerary, which is product $Y_2$. The robot $R_2$ then moves along the travel path to the storage unit 72e associated with product $Y_2$ where it waits (at location 73e) to receive the product $Y_2$. After the product $Y_2$ is received, the robot $R_2$ travels to area 76 where the products are unloaded. The robot then returns to area 71 to wait for further instructions from the device 12.

Robot $R_3$ is assigned order $O_2$ which has only one product, namely, product $Z_1$. The robot $R_3$ generates a travel path 78c to the storage unit 72e where product $Z_1$ is located. The robot $R_3$ then waits (at location 73e) for the product $Z_1$ to be loaded to its container by picker 74c. After it is detected that the product $Z_1$ has been placed in the container, the robot $R_3$ moves to area 76 for unloading and then once unloaded back to area 74 to await further instructions.

Figure 8:
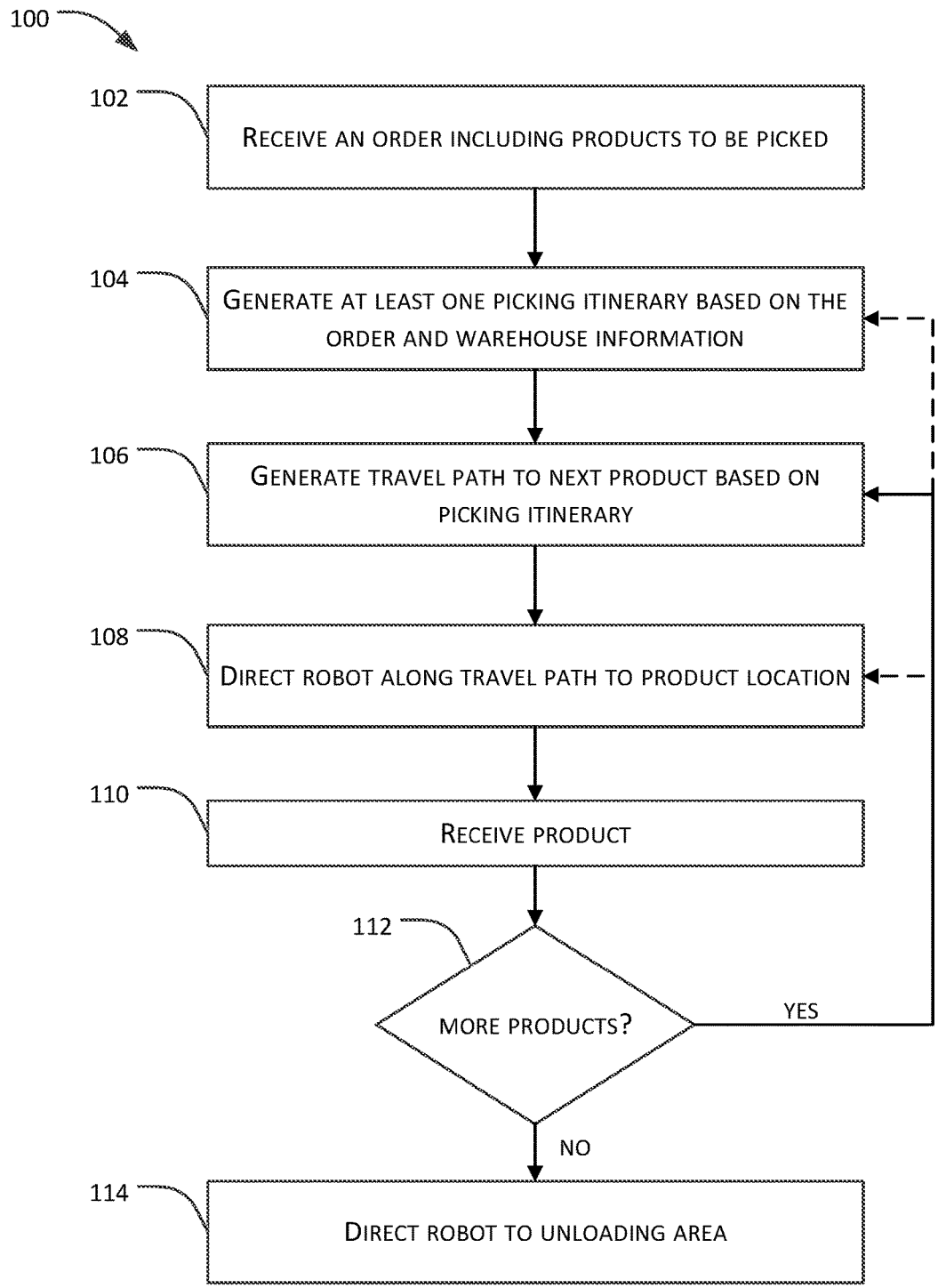
FIG. 8 is a flow chart illustrating a method for transporting products according to some embodiments.

Referring now to FIG. 8, illustrated therein is a method 100 for transporting products according to some embodiments. The steps of the method 100 may be executed by the order-processing processor 14, robot processor 46 or a combination thereof as described herein.

The method 100 begins at step 102 wherein at least one order including at least one product to be picked is received.

At step 104, at least one picking itinerary is generated based upon the at least one order and warehouse information. The at least one picking itinerary includes the at least one product to be picked, at least one product location indicative of where the product is stored, and a sequence of picking the at least one product.

At step 106, at least one travel path for the at least one robot is generated based upon the picking itinerary.

At step 108, the robot is directed along the travel path to the at least one product location.

At step 110, the at least one product may be received in at least one product container of the robot.

At step 112, it is determined whether there are additional products to be retrieved. If there are additional products, the method 100 returns to step 106 where a travel path to a product location of the next product to retrieve on the picking itinerary is generated.

In some embodiments, the method 100 may return to step 104 wherein a picking itinerary is regenerated. Regenerating the picking itinerary may allow more current warehouse information to affect the picking itinerary. For example, if a particular product location has become congested since the previous picking itinerary was generated, then regenerating the picking itinerary may consider this information and avoid the product location for the time being.

In some embodiments, if the travel path to the next product location has been generated, the method 100 may return to step 108.

Once there are no more products to transport, the method continues to step 114, wherein the robot is directed to an end area where the robot may be unloaded.

Figure 9:
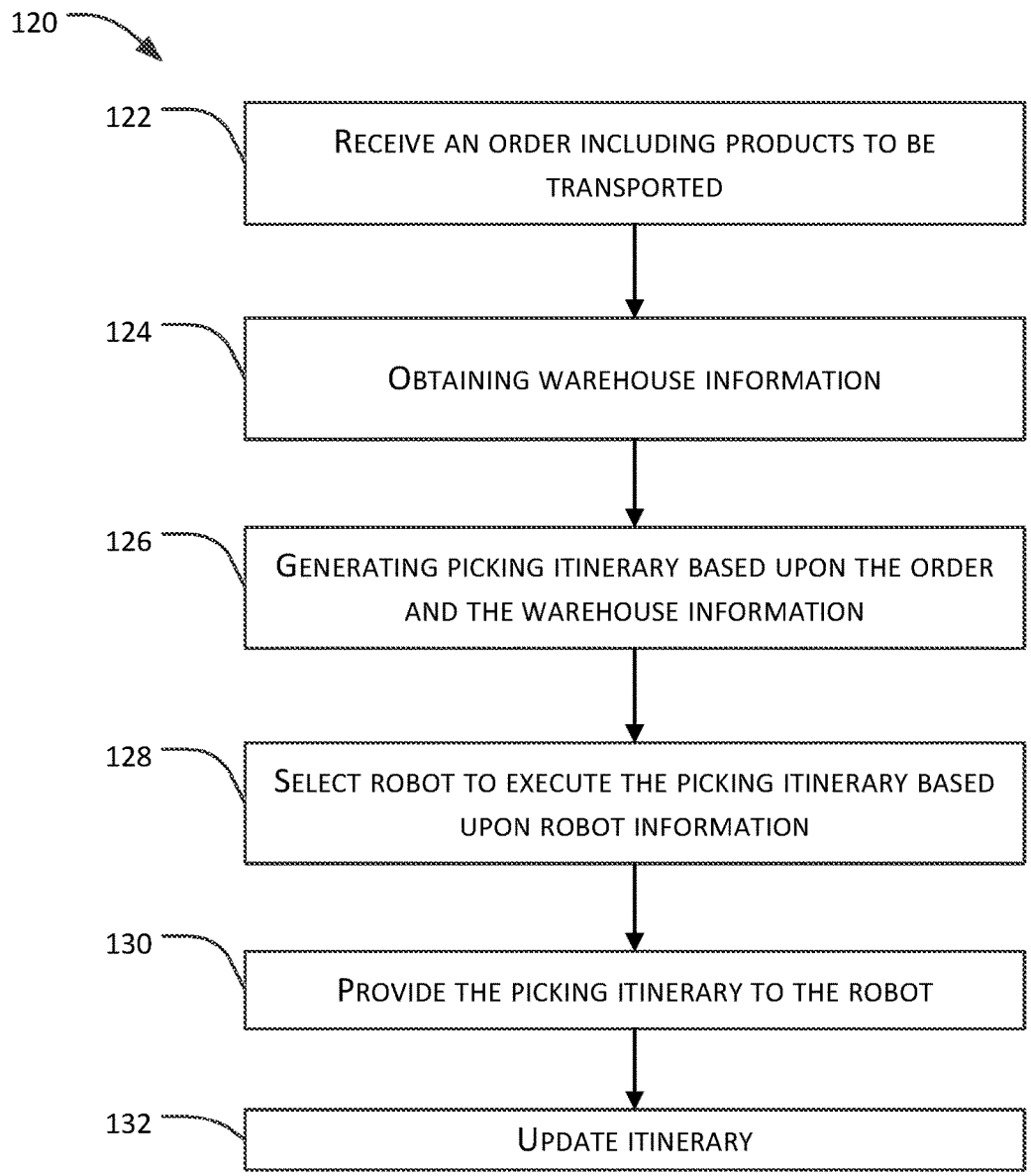
FIG. 9 is a flow chart illustrating a method for transporting products according to some embodiments, which may be executed by the order-processing processor shown in FIG. 2.

Referring now to FIG. 9, illustrated therein is a method 120 for transporting products according to some embodiments. The method 120 generates picking itineraries that may be executed by picking robots to transport the products. In some cases, the method 120 may be executed by the order-processing processor, or a combination of the order-processing processor and the robot processor described herein above with reference to system 10.

The method 120 begins at step 122 wherein an order is received. The order includes one or more products to be transported.

At step 124, warehouse information is obtained. The warehouse information, for example, may be the same as or similar to the warehouse information 54 described hereinabove with reference to system 10.

At step 126 a picking itinerary is generated based upon the order and the warehouse information. The picking itinerary includes information indicative of the location of the at least one product and if there are multiple products to be transported, then a sequence for transporting the products. The sequence for transporting the products describes the order in which the products should be transported. In some cases, more than one itineraries may be generated (for example for a large order, if the order has products that are located in distinct areas of the warehouse, etc.).

At step 128, one of the robots is selected to execute the picking itinerary based upon the robot information associated with the robots. For example, capabilities and availability of the robots may help select the robot as described herein above with reference to system 10. If multiple itineraries are generated, then multiple robots are selected.

At step 130, the picking itinerary is provided to the selected robot.

At step 132, the method 120 may update the itinerary that had been provided to the selected robot in some cases. For example, if the warehouse information indicates that some locations within the warehouse are under-utilized or over-utilized, the itinerary may be updated to reflect this change. In another example, the robot may be assigned another itinerary to execute simultaneously with the first itinerary.

Figure 10:
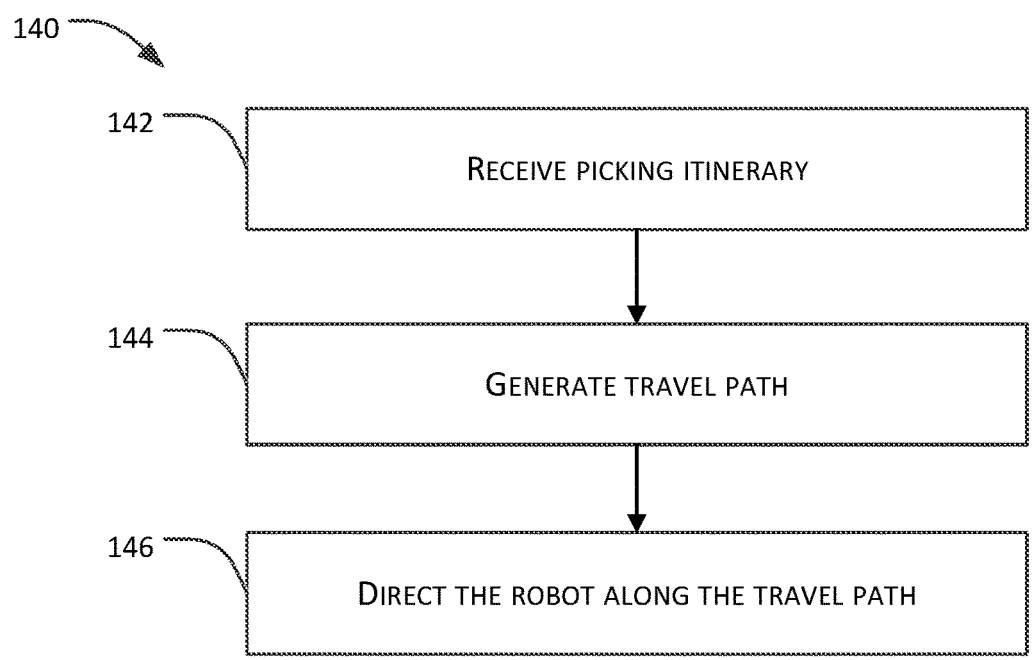
FIG. 10 is a flow chart illustrating a method for transporting products according to some embodiments, which may be executed by the robot-processor shown in FIG. 4.

Referring now to FIG. 10, illustrated therein is a method 140 for transporting products within a warehouse according to some embodiments. The method 140 may be executed by the robot processor, or a combination of the robot processor and the order-processing processor described hereinabove with reference to FIG. 1.

Method 140 starts at step 142, wherein picking itinerary is received. The picking itinerary may be a picking itinerary generated by the method 120 described herein above.

At step 144, a travel path is generated based upon the picking itinerary. For example, the picking itinerary may include location information indicative of a location where the product to be transported is located, and a travel path to the location is generated based upon the location information and current location of the robot.

If there are a plurality of products to be transported, the picking itinerary may include a sequence by which the products should be picked. In such a case, the travel path to the first product in the sequence is generated.

At step 146, the robot is directed along the generated travel path. In some cases, the method may involve directing the robot to avoid stationary and/or mobile obstacles.

If there are additional products to be transported, then the method returns to step 144 where the travel path to the next destination is generated.

If there are no additional products to be transported, then the method directs the robot to a defined area where the products may be loaded or unloaded.

In some cases, the warehouse information is updated periodically so that the warehouse information remains indicative of a current status of the warehouse.

The above described embodiments illustrate how various products may be retrieved from various storage units. In other embodiments, the systems, apparatuses, and methods may be implemented to transport products to their location throughout the warehouse. For example, products may be loaded at the robots to deliver to various storage units whereby the products may be transferred to the storage units.

While the above description provides examples of one or more apparatus, systems and methods, it will be appreciated that other apparatus, systems and methods may be within the scope of the present description as interpreted by one of skill in the art.

The invention claimed is:

1. A system for transporting products comprising:
one or more picking robots, each picking robot including a drive unit for moving the picking robot, at least one product container, and at least one robot processor; and
at least one order-processing device including at least one order-processing processor in data communication with the at least one robot processor;
wherein the order-processing processor is configured to:
 receive a plurality of orders, each order including one or more products to be picked;
 select one or more robots to execute the orders;
  wherein the robots are selected based on their capabilities and load capacity; and
  wherein a single order that includes multiple products to be picked is split between multiple robots;
 generate multiple picking itineraries based upon the single order and warehouse information, and assign each of the generated picking itineraries associated with the single order to a different robot, such that each of the different robots is tasked to pick up at least one product associated with the single order;
 generate a travel path for the each of the different robots; and
 direct the drive unit of the each of the different robots to move them along their respective generated travel path to at least one product location such that the at least one product may be received in the at least one product container of the each of the different robots.

2. The system of claim 1, wherein the warehouse information is indicative of a current travel condition for the robot within a product warehouse.

3. The system of claim 1, wherein the warehouse information includes congestion information indicative of one or more congested areas within the warehouse.

4. The system of claim 1, wherein the warehouse information includes utilization information indicative of at least one of under-utilization and over-utilization of some areas within the warehouse.

5. The system of claim 1, wherein at least one picking itinerary is generated to account for changes in the warehouse information.

6. The system of claim 5, wherein the at least one picking itinerary is generated periodically.

7. The system of claim 5, wherein the at least one picking itinerary is generated when one of the products is received at the picking robot.

8. The system of claim 5, wherein the robot processor is configured to avoid one or more obstacles including at least one of mobile obstacles and stationary obstacles.

9. The system of claim 1, wherein the travel path is generated based upon at least one picking itinerary and a map.

10. The system of claim 1, wherein the travel path is generated dynamically as the robot moves to the at least one product location.

11. The system of claim 1, wherein the robot processor is configured to direct the robot to wait at a designated wait area associated with the at least one product location until the at least one product located at the location is received in the at least one product container.

12. The system of claim 1, wherein the travel path is generated based upon markers in at least one of a floor of the warehouse, a ceiling of the warehouse, and one or more storage units.

13. The system of claim 1, wherein the robot comprises a positioning device for determining a current position of the robot.

14. The system of claim 1, wherein the robot comprises a display device, and the robot processor is configured to provide information via the display device.

15. The system of claim 1, wherein the robot comprises a product sensor for determining when the at least one product is received in the container.

16. The system of claim 1, wherein the robot processor is configured to identify one or more storage units proximate to the robot to determine a location of the robot.

17. The system of claim 1, wherein the robot further comprises at least one product indicator configured to optically indicate the location of the product.

18. The system of claim 1, wherein the robot further comprises at least one destination indicator configured to optically indicate a destination for placing the product.

19. The system of claim 18, further comprising storage units for storing the at least one product, the storage units having associated at least one location indicators adapted to indicate a location of the at least one product.

20. The system of claim 1, further comprising an automated feeder mechanism to pick the at least one product from at least one storage unit, wherein the automated feeder mechanism is configured to place the at least one product in the at least one product container.

* * * * *